(Model.)
G. SIMPSON.
PLOW.
No. 280,680. Patented July 3, 1883.
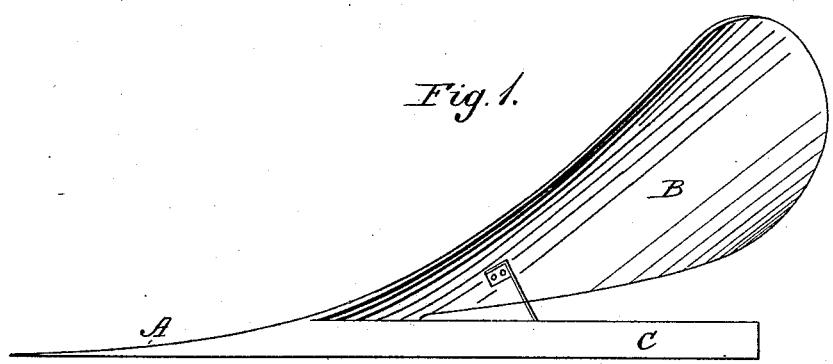
Fig. 1.
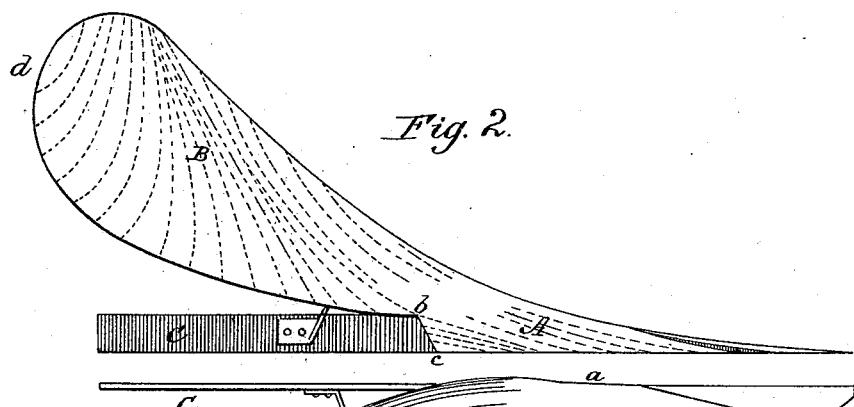
Fig. 2.
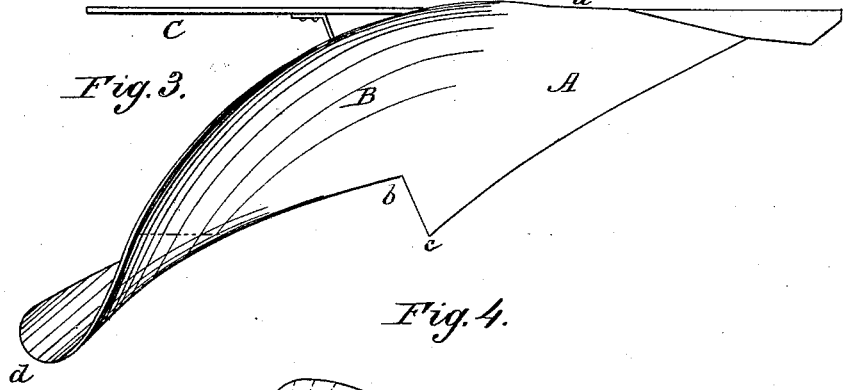
Fig. 3.
Fig. 4.
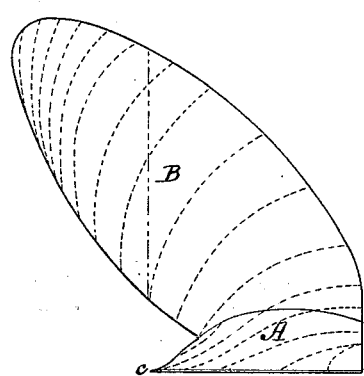
WITNESSES:
W. W. Hollingsworth
W. X. Stevens
INVENTOR:
Geo. Simpson
BY Munn & Co.
ATTORNEYS.

UNITED STATES PATENT OFFICE.

GEORGE SIMPSON, OF BRYAN, TEXAS.

PLOW.

SPECIFICATION forming part of Letters Patent No. 280,680, dated July 3, 1883.

Application filed March 5, 1883. (Model.)

*To all whom it may concern:*

Be it known that I, GEORGE SIMPSON, a citizen of the United States, residing at Bryan, in the county of Brazos and State of Texas, have invented a new Improvement in Plows, of which the following is a specification.

My invention relates to that class of plows used for plowing land; and it has for its object to produce a plow which shall scour or clean itself readily in sticky soil and shall be light of draft. To this end it consists in the construction and combination of the point and mold-board of a plow, hereinafter described and claimed, reference being had to the accompanying drawings, in which—

Figure 1 is a land-side elevation, and Fig. 2 is an elevation of the reverse side. Fig. 3 is a plan view, and Fig. 4 is a front view, of part of a plow, showing my invention.

A represents the plowshare, which is secured to the mold-board B and to the landside C by the usual bolts.

The main peculiarity of my plow is the form given to the share and mold-board to cause the same to scour or clear in sticky soil. All vertical longitudinal sections of the share and mold-board parallel to the landside C, between said side and the angle $b$, are concave lines at the forward and upward side, of about the same curve. From this point to the outer angle, $c$, of the wing such sections will be straight lines on the wing of the share; but these lines, continued on the mold-board, gradually become less curved until the sector-plane, touching the point $c$, cuts the mold-board in a straight line at a rearward angle of about sixty degrees with the horizon. From this line the lower edge of the mold-board begins to turn under, and said sections begin to grow convex forward, the convexity increasing and the board turning more and more under as its extremity $d$ is approached, all as shown in Fig. 2. Vertical sections at right angles to the landside are convex upward and away from the landside, all in the rear of the point except on the wing of the share, where they are concave, as shown in Fig. 4. The point of the share is a lap of steel extending well forward and chisel-shaped. It is welded on top of the share and draws to a point to the rear at the landside, as shown.

The general side appearance of this plow is that of a very acute angle forward, or thin wedge, rising in an easy curve to the rear part of the mold-board, which stands over to completely turn the sod.

Having thus described my invention, what I claim, and wish to secure by Letters Patent, is—

The mold-board A B, formed as shown and described, being made long and narrow and convex throughout its entire length, and rising from front to rear at an angle of about twenty-five degrees, and presenting concave lines in vertical section parallel to the landside, and having its rear lower edge curved under, and approaching nearer the vertical plane of the landside than its upper edge, substantially as described, and for the purpose set forth.

GEORGE SIMPSON.

Attest:
W. R. CAVITT,
A. W. CEURNAL,
R. RUBENSTEIN.